UNITED STATES PATENT OFFICE.

ALFRED GORDON SALAMON, OF LONDON, AND CHARLES JEENS GRACE, OF STEYNING, ENGLAND, ASSIGNORS TO THE EXPLORATION COMPANY, LIMITED, OF LONDON, ENGLAND.

PREPARATION OF CHINA-CLAY.

1,032,862.          Specification of Letters Patent.          Patented July 16, 1912.

No Drawing.          Application filed December 4, 1909. Serial No. 531,392.

*To all whom it may concern:*

Be it known that we, ALFRED GORDON SALAMON, F. I. C., consulting and analytical chemist, and CHARLES JEENS GRACE, A. I. M. M., subjects of the King of Great Britain, residing, respectively, at 1 Fenchurch avenue, London, and Chantry Green House, Steyning, Sussex, England, have invented a new and useful Preparation of China-Clay, of which the following is a specification.

This invention relates to improvements in the preparation of china clay as hitherto practised.

A large proportion of the china clay put upon the market is used for bleaching purposes and its selling value is to a very great extent dependent upon its freedom from color.

We have found that the coloring matter can be almost entirely, if not wholly, removed by subjecting an emulsion of the clay, *i. e.*, particles of clay suspended in water, whether concentrated or comparatively dilute to the action of a suitable sulfite which may be hydrogen sulfite that is sulfurous acid or a bisulfite or other compound of sulfurous acid which is capable of combining with the coloring matter and forming soluble salts or compounds. The quantity of reagent required, which is very small compared to the quantity of clay to be treated, will be dependent upon the amount of coloring matter to be removed and may be determined by previous experiment upon the small scale. If, as is preferable, a filter press be used for subsequent treatment of the china clay, we advise that the china clay while in the press be well washed with water so as to remove practically the whole, if not the whole, of the added reagent and any soluble salts or compounds which it may have formed. We have found that by such treatment the value of the product obtained is greatly enhanced and further that a low or second quality clay may by such elimination of the objectionable constituent or constituents be fairly brought into the category of first quality clays suitable for use in bleaching.

The process of treatment above described will also apply to china clay sold as "potter's clay" provided that the emulsion does not contain an undue proportion of mica containing coloring matter. Should this be the case then the coloring matter above referred to is liable to become visible upon firing.

What we claim is:—

1. In the preparation of china clay, the process of decolorizing the clay, which consists in subjecting it to the action alone of a sulfite capable of combining with the coloring matter and forming soluble salts or compounds.

2. In the preparation of china clay the process for decolorizing the clay which consists in subjecting it to the action of sulfurous acid alone.

3. In the preparation of china clay the process for decolorizing the clay which consists in subjecting an emulsion of the clay to the action of sulfurous acid alone and then filtering the emulsion by pressure.

4. In the preparation of china clay the process for decolorizing the clay which consists in subjecting an emulsion of the clay to the action of sulfurous acid alone, then filtering the emulsion by pressure and washing the filtered clay.

5. In the preparation of china clay, the process herein described for decolorizing the clay which consists in subjecting an emulsion of the clay to the action alone of a sulfite capable of combining with the coloring matter and forming soluble salts or compounds.

ALFRED GORDON SALAMON.
CHARLES JEENS GRACE.

Witnesses:
CHARLES EDWIN FAIRHALL,
HARRY WILLES.